(12) United States Patent
Bouaziz et al.

(10) Patent No.: US 10,152,223 B2
(45) Date of Patent: Dec. 11, 2018

(54) SYSTEM-INITIATED HELP FUNCTION FOR OPERATING AN APPARATUS ASSOCIATED WITH A VEHICLE-INPUT OF SPACES

(71) Applicant: AUDI AG, Ingolstadt (DE)

(72) Inventors: Tahar Bouaziz, Ingolstadt (DE); Michael Betz, Gaimersheim (DE); Simone Paula, Rain (DE)

(73) Assignee: AUDI AG, Ingolstadt (DE)

( * ) Notice: Subject to any disclaimer, the term of this patent is extended or adjusted under 35 U.S.C. 154(b) by 67 days.

(21) Appl. No.: 14/764,761

(22) PCT Filed: Jan. 28, 2014

(86) PCT No.: PCT/EP2014/000225
§ 371 (c)(1),
(2) Date: Oct. 13, 2015

(87) PCT Pub. No.: WO2014/117930
PCT Pub. Date: Aug. 7, 2014

(65) Prior Publication Data
US 2016/0139796 A1    May 19, 2016

(30) Foreign Application Priority Data

Feb. 2, 2013 (DE) .......... 10 2013 001 884

(51) Int. Cl.
G06F 3/0488 (2013.01)
G06F 3/0489 (2013.01)
(Continued)

(52) U.S. Cl.
CPC ......... G06F 3/04883 (2013.01); B60W 50/10 (2013.01); B60W 50/14 (2013.01);
(Continued)

(58) Field of Classification Search
CPC ................ G06F 3/04883; G06F 3/167; B60K 2350/1052; B60W 50/10; B60W 50/14
See application file for complete search history.

(56) References Cited

U.S. PATENT DOCUMENTS 6,424,908 B2   7/2002   Urban et al.
8,731,735 B2   5/2014   Lungwitz et al.
(Continued)

FOREIGN PATENT DOCUMENTS

CN   101493331   7/2009
CN   101907466   12/2010
(Continued)

OTHER PUBLICATIONS

Gupta, "How to Turn Off Auto-Correct in Android and iPhone", published: Aug. 27, 2012, http://theitechblog.com/2868/how-to-turn-off-auto-correct-in-android-and-iphone/.*
(Continued)

Primary Examiner — Kevin L Young
Assistant Examiner — Seth A Silverman
(74) Attorney, Agent, or Firm — Staas & Halsey LLP

(57) ABSTRACT

System-initiated help is provided for operating an apparatus associated with a vehicle, in which alphanumeric characters and/or symbols can be selected using an operating device and can be assembled to form a character or function group and can be displayed in an input field on a first display device. A detection operation is carried out, on the basis of which it is detected whether the user inputs or must input a space in a next operating step with a predefinable degree of probability. If the detection operation has a positive result, assistance is displayed to the user on the first or second display device and/or is output to the user using the loud-
(Continued)

speaker device. The assistance has an item of help information relating to how a space can be input in the apparatus using an operating action.

21 Claims, 2 Drawing Sheets

(51) Int. Cl.
  *G06F 3/023* (2006.01)
  *B60W 50/10* (2012.01)
  *B60W 50/14* (2012.01)
  *G06F 3/16* (2006.01)
  *G06F 9/451* (2018.01)

(52) U.S. Cl.
  CPC .......... *G06F 3/0233* (2013.01); *G06F 3/0237* (2013.01); *G06F 3/04886* (2013.01); *G06F 3/04895* (2013.01); *G06F 3/167* (2013.01); *G06F 9/453* (2018.02); *B60K 2350/1052* (2013.01)

(56) References Cited

U.S. PATENT DOCUMENTS

| | | | |
|---|---|---|---|
| 2003/0058266 A1 | 3/2003 | Dunlap et al. | |
| 2003/0067495 A1 | 4/2003 | Pu et al. | |
| 2004/0071344 A1* | 4/2004 | Lui | G06F 3/038 382/181 |
| 2008/0284782 A1 | 11/2008 | Englerth | |
| 2008/0316183 A1 | 12/2008 | Westerman et al. | |
| 2009/0006956 A1 | 1/2009 | Bae et al. | |
| 2009/0319894 A1 | 12/2009 | Markiewicz et al. | |
| 2010/0070908 A1* | 3/2010 | Mori | G06F 3/0237 715/773 |
| 2011/0154216 A1* | 6/2011 | Aritsuka | G06F 9/4443 715/745 |
| 2012/0084075 A1* | 4/2012 | Yamada | G06F 3/0236 704/9 |
| 2012/0206367 A1 | 8/2012 | Griffin et al. | |
| 2012/0306927 A1* | 12/2012 | Lee | G06F 3/041 345/660 |
| 2014/0115519 A1* | 4/2014 | Ouyang | G06F 3/0482 715/773 |

FOREIGN PATENT DOCUMENTS

| | | |
|---|---|---|
| CN | 102067079 | 5/2011 |
| CN | 102163098 | 8/2011 |
| CN | 102365525 | 2/2012 |
| CN | 102741784 | 10/2012 |
| DE | 102005018467 | 11/2006 |
| DE | 102007023313 | 11/2008 |
| DE | 102008049636 | 4/2010 |
| DE | 10 2013 001 884.6 | 2/2013 |
| EP | 0905662 | 3/1999 |
| EP | 1120633 | 8/2001 |
| EP | 1150204 | 10/2001 |
| WO | 03/048930 | 6/2003 |
| WO | 2008/014099 | 1/2008 |
| WO | 2011/073992 | 6/2011 |
| WO | PCT/EP2014/000225 | 1/2014 |

OTHER PUBLICATIONS

Gupta, "How to Turn Off Auto-Correct in Android and iPhone", published: Aug. 27, 2012, http://theitechblog.com/2868/how-to-turn-off-auto-correct-in-android-and-iphone/ (Year: 2012).*

Electric_Teacher, "Microsoft Office Assistant", copyright 2009, electricteacher.com, http://www.electricteacher.com/wassistant.htm (Year: 2009).*

German Office Action for German Priority Patent Application No. 10 2013 001 884.6, dated Dec. 2, 2013, 8 pages.

English language International Search Report for PCT/EP2014/000225, dated May 26, 2014, 3 pages.

WIPO English Language Translation of the International Preliminary Report on Patentability for PCT/EP2014/000225, downloaded from WIPO website on Oct. 11, 2015 7 pages.

Chinese Office Action dated Mar. 27, 2017 in corresponding Chinese Application No. 201480019579.4.

Chinese Patent Reference 102741784 dated Oct. 17, 2012, (2 Pages including English Abstract).

Chinese Office Action dated Feb. 24, 2017 in corresponding Chinese Patent Application No. 201480018945.4.

* cited by examiner

SYSTEM-INITIATED HELP FUNCTION FOR OPERATING AN APPARATUS ASSOCIATED WITH A VEHICLE-INPUT OF SPACES

CROSS REFERENCE TO RELATED APPLICATIONS

This application is based on and hereby claims priority to International Application No. PCT/EP2014/000225 filed on Jan. 28, 2014 and German Application No. 10 2013 001 884.6 filed on Feb. 2, 2013, the contents of which are hereby incorporated by reference.

BACKGROUND

The present invention comprises a method for displaying and/or outputting a system-initiated help for operating a device allocated to a vehicle, and a correspondingly configured device allocated to a vehicle.

In modern vehicles (motor vehicles), a number of devices is often provided at which and/or for which user inputs can be carried out. In this context, the devices can not only be activated or deactivated, i.e. switched on and off, but often adjustments can also be carried out, selections made or inputs performed.

Examples of such devices in vehicles are a satellite-based navigation system, a multimedia installation, an automobile telephone system or a device for Internet access integrated in a vehicle.

The user inputs for such devices can be effected in various ways, an input by using a rotary/pressure adjuster, joystick or one or a plurality of keys currently probably representing the procedure used most frequently. In addition, further input options are known such as, for example, by using a touch pad or a touch-sensitive display facility (screen) or by voice input. In all cases, the adjustments/selections/inputs made can be displayed on a display facility (screen, head-up display).

In the devices mentioned above, a sequence of characters (letters, numbers, spaces, etc.) and/or symbols can or must be selected or input for operation, for example when inputting the destination for a satellite-based navigation system, for inputting a new contact person into the or selecting a known contact person from the storage device of an automobile telephone system, when operating a device for mobile Internet access, etc.

EP 0 905 662 A2 describes an input system at least for place and/or street names with an input arrangement with a data source arrangement containing at least one place and/or street list and with a control arrangement which is provided for searching place or street names input via the input arrangement in a place or street list of the data source arrangement. To simplify the input of place or street names, the data source arrangement contains, apart from a first place and/or street list with alphabetically sorted place and/or street names, at least one second place and/or street list with place and/or street names, sorted in accordance with a frequency criterion. Voice inputs are forwarded to the control arrangement from a voice input system of the input arrangement. The control arrangement is then provided for a sequential search of a place or street name, input verbally, from the beginning of the second place or street list.

EP 1 120 633 A2 proposes a method for inputting information including at least one character of an alphabet into an electric device wherein, after inputting a character of the alphabet, the character, or in the case where one or several characters have already been input before the character input, the chain of characters formed from the characters input previously and last is compared with information from a comparative set of information and, in the case of correspondence of the character with the first character of an information item of the comparison set or in the case of correspondence of the character string with the beginning of an information item of the comparison set, this information is offered as information to be input.

DE 10 2005 018 467 A1 has a method for the selection of a destination in a navigation system as a subject matter in which each destination from a totality of all destinations is defined by destination parameters and a set of possible destinations is restricted incrementally from the totality of all destinations by inputting individual characters for in each case one destination parameter. It is provided that, when inputting the characters, it possible to change from one destination parameter to inputting a character for another destination parameter.

DE 10 2007 023 313 A1 describes a display facility and a method for operating an electronic display facility for displaying a plurality of characters of a set of characters, particularly for displaying letters and/or numbers. At least one character of the set of characters can be selected by operating a selection device and selected for further processing by operating a selection device. The characters are then arranged on a curved arc line and displayed.

And DE 10 2008 049 636 A1 describes a method for inputting a destination for a navigation system. The method comprises detecting a character string which is input by a user as part of a designation of the destination and determining a set of destination designations in dependence on the character string detected. The set of destination designations is determined by selecting from a pool of destination designations those which comprise the character string. The method also comprises displaying the particular set of destination designations on a display unit for the user. Finally, a selection, made by the user, of a destination designation from the displayed set of destination designations is acquired.

SUMMARY

One potential object is to provide a solution for how the inputting of a space can be facilitated for a user in the case of a device allocated to a vehicle.

The inventors propose a method for displaying and/or outputting a system-initiated help for operating a device allocated to a vehicle is proposed. In the device, at least alphanumeric characters (letters, numbers, spaces etc.) and/or symbols can be input or selected by an operating facility and assembled to form a group of characters or functions and displayed in at least one input field on a first display facility, and at least one help information item for at least one operating action at the device can be displayed for a user visually on the first or a second display facility and/or output acoustically by a loudspeaker facility.

The method is characterized by the fact that, a recognition process is carried out on the basis of which it is recognized whether a space will or must be input by the user with a predeterminable degree of probability in a next operating action, and then, in the case where the recognition process exhibits a positive result, assistance is displayed to the user on the first or second display facility and/or output by the loudspeaker facility, the assistance exhibiting an item of help information on how a space can be input at the device by an operating action.

It is known to many users of devices allocated to a vehicle such as, for example, satellite-based navigation systems according to the related art, that spaces can be input. In this respect, different solutions are also known from the related art such as special space insertion keys and space insertion icons.

In the case of modern devices in which the operation is implemented, for example, with the aid of a touch-sensitive screen or a touchpad and in which, for example, characters and/or symbols are input by the detection of characters and/or symbols which were "written" by the user with a finger or input pen on the touch-sensitive screen or touchpad, such space insertion keys or space insertion icons frequently no longer exist.

For this reason, it is particularly of advantage, especially in the case of such modern devices, if corresponding assistance is offered to the user for a situation as it is given when the input of a space is required.

But also in the case of devices to be operated conventionally, that is to say, for example with the aid of key(s), rotary/push-type controllers, joystick, it may be helpful to a user if, according to the proposals, he receives assistance for inserting a space as can be achieved with the corresponding device, in particular in an as fast and/or comfortable manner as possible.

The proposal thus provides a user with assistance with familiarizes him with which operating action an insertion of a space is possible in the device.

This does not only have the advantage that a user is familiarized with the possibilities of the device but, in particular, also serves to increase the road safety since a user needs a shorter time for certain operating actions at the device—in this case insertion of a space, and thus the time interval of a possible distraction from the road traffic is shortened. In addition, it offers the advantage that the information of how a space can be entered does not have to be continuously displayed or no separate key has to be provided for this purpose—the user thus is not continuously flooded with information and, as a result, is also distracted less or orients himself more quickly since only the information of importance at the time and needed is displayed.

According to a first advantageous development, the help information is displayed in the method in the form of moving or static images, characters, text and/or symbols and/or is output in the form of a spoken text.

According to a second advantageous development, the help information is displayed and/or output in the method in dependence on (a) how often the help information for inputting a space at the device has already been displayed and/or output during a trip, (b) how often the help information for inputting a space at the device has already been displayed and/or output to a recognized and/or known user within a predeterminable period of time, and/or (c) the manner in which a user inputs a space at the device.

A purely schematically repetitive assistance is often felt to be a nuisance by a user. This can be avoided by "graduated" assistance and the assumed level of knowledge or awareness of a user can be taken into consideration.

According to a further advantageous development, the assistance can be activated and deactivated.

The inventors also propose a device allocated to a vehicle, with an operating facility by which at least alphanumeric characters (letters, numbers, spaces etc.) and/or symbols can be input or selected and assembled to form a group of characters or functions, with a first display facility on which the characters, symbols, group of characters and/or functions can be displayed in at least one input field, and with a help facility by which at least one item of help information for at least one operating action at the device can be displayed visually for a user on the first or a second display facility and/or output acoustically by a loudspeaker facility.

The device is characterized by the fact that it has a recognition device by which it is recognized whether a space will or has to be input by the user in a next operating action with a predeterminable degree of probability, and the help facility is arranged for the purpose that for the case where a positive result of the recognition is found by the recognition device, an assistance is displayed to the user on the first or second display facility and/or is output by the loudspeaker facility, in such a manner that the assistance exhibits an item of help information on how a space can be input at the device by an operating action.

According to a first advantageous development, the help facility is arranged for the purpose that it displays the item of help information in the form of moving or static images, characters, text and/or symbols on the first or second display facility and/or outputs it in the form of a spoken text by the loudspeaker facility.

According to a second advantageous development of the device, the help facility is arranged for the purpose that it displays and/or outputs the item of help information in dependence on (a) how often the item of help information for inputting a space at the device has already been displayed and/or output during a trip, (b) how often the help information for inputting a space at the device has already been displayed and/or output to a recognized and/or known user within a predeterminable period of time, and/or (c) the manner in which a user inputs a space at the device.

According to a third advantageous development, the help facility is arranged for the purpose that the assistance can be activated and deactivated.

It is also of advantage if at the device, the first and/or second display facility comprises at least one screen and/or one head-up display and the operating facility comprises at least one key, keyboard, one rotary/push-type controller, joystick, one touchpad, one touch-sensitive screen and/or one device for voice input and voice recognition.

It is also advantageous if the device is configured to achieve that a space can be input by an substantially horizontal stroking with one finger over a predeterminable distance or a predeterminable proportion of the width of a touch-sensitive screen or touchpad.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
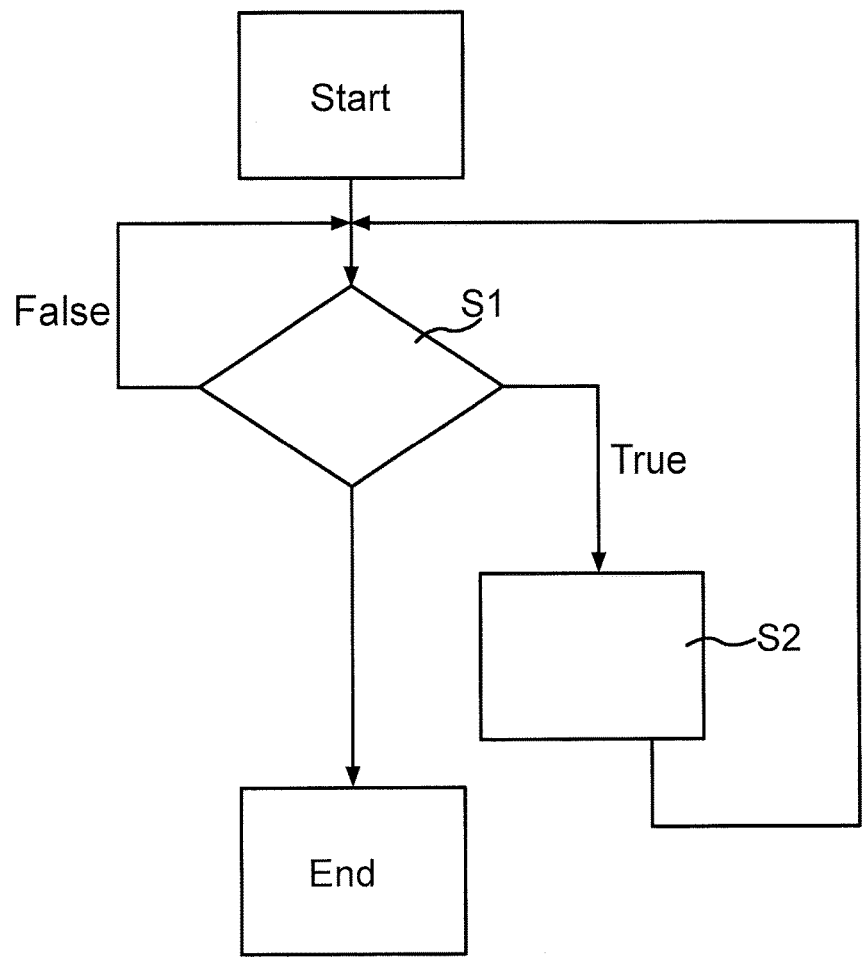
FIG. 1: shows a diagrammatic flowchart of one embodiment of the proposed method.

Reference will now be made in detail to the preferred embodiments of the present invention, examples of which are illustrated in the accompanying drawings, wherein like reference numerals refer to like elements throughout.

The representations in the figures are purely diagrammatic and not true to scale.

The exemplary embodiments explained in the text which follows represent preferred embodiments. Naturally, the present invention is not restricted to these embodiments.

FIG. 1 shows a diagrammatic flowchart of one embodiment of the proposed method. The method starts when, for example, the device allocated to the vehicle, for example a satellite-based navigation system, is activated.

Figure 2:
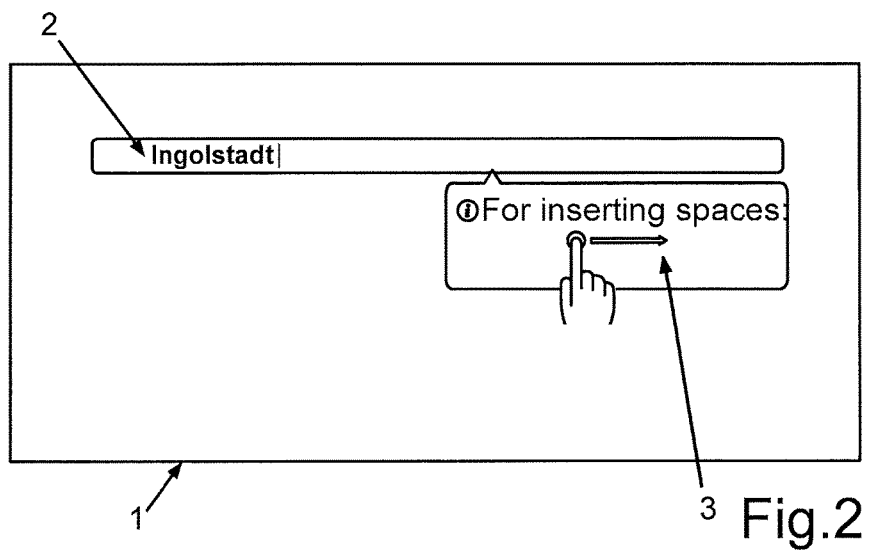
FIG. 2: shows a diagrammatic representation of an example of the assistance proposed to be provided.

After an activation of the device, a user selects, for example, successively a plurality of characters/symbols 2 with the aid of an operating facility or inputs them, e.g. by "writing" on a touchpad or a touch-sensitive screen and performing a recognition of handwriting. This plurality of characters/symbols 2 is usually displayed to the user on a first display facility 1 such as a screen or a windshield by a head-up display facility. An example of such a selection and display is shown in FIG. 2 in the form of "Ingolstadt".

According to S1, a detection process is now performed on the basis of which it is detected whether the user will or has to input a space in a next operating action with a predeterminable degree of probability.

The predeterminable degree of probability is not particularly restricted but should be selected in such a manner that it can be assumed with a probability of more than 60%, 65%, 70%, 75%, 80%, 85%, 90%, 95%, 96%, 97%, 98%, 99% or 100% that the user would like to input a space in a next operating action. The criterion for the corresponding calculation or estimation of the probability can be, for example, the input of a complete word or the transfer of a word from a proposed selective list.

Judging that a complete word is present is unproblematic if a word has been taken over from a proposed selective list. If a user inputs individual characters into the device or selects these, judging whether the word is complete can be done, for example, by comparing it with entries stored in a database in which, for example, all possible place names, street names, "points of interest" etc. are stored in the case of a satellite-based navigation system.

If, as is shown in the example shown in FIG. 2, a user has input the name of a locality (in this case "Ingolstadt") into a device—here, for example, a satellite-based navigation device—or has selected this locality—possibly after inputting a first part of the place name—from a list of localities proposed by the device, the street name can be input immediately in the case of a device in which it is not possible or obligatory (as is often the case in devices according to the related art) subsequently to change into a special field for inputting a street, for example after inputting a space, or, if necessary, it is only necessary to input a part of the street name.

If it is detected by the detection process that a space is or has to be input by the user in a next operating action with a predeterminable degree of probability, that is to say the detection process has a positive result ("true" in FIG. 1), an assistance is displayed to the user on the first or a second display facility 1, and/or output by the loudspeaker facility, in S2, the assistance exhibiting the help information 3 about how a space can be input at the device by an operating action.

After that—as also in the case where the detection process has a negative result—the method returns to S1. The method ends when the device is deactivated which may the case, for example, when the vehicle is parked.

A "second display facility" can be, for example, a second screen, a second head-up display facility or only a part of a screen or of a head-up display device not used by the display of the device. When the assistance is displayed on a display facility, it is of advantage, as a rule, if the display of the assistance occurs in the relative vicinity of the display of the characters/symbols 2 input or selected, for example briefly next to, below or above the characters/symbols 2 input or selected of which it is assumed that a user would subsequently like to insert a space.

During the input/selection of characters/symbols 2 into a device, a user will regularly look at the characters/symbols 2 input on the display facility 1 so that he will also perceive an assistance which is displayed in the vicinity of these characters/symbols 2 directly without having to significantly change his direction of viewing. An example of a spatially close representation of characters/symbols 2 and an assistance for a next operating action is shown in FIG. 2.

Alternatively or additionally, the assistance can also take place by a loudspeaker facility as exists, for example, for the car radio or a multimedia system of a vehicle. In this context, a spoken help text with instructions for inputting a space can be output, for example, optionally supported by a static or dynamic display on a display facility.

Since a purely schematic assistance is often felt to be a nuisance by a user, the help facility can be advantageously configured to display and/or output the help information 3 in dependence on (a) how often the help information 3 for inputting a space has already been displayed and/or output by the device during a trip, (b) how often the assistance for inputting a space has already been displayed and/or output by the device to a detected and/or known user within a predeterminable period of time, and/or (c) the manner in which a user inputs a space at the device.

This makes it possible to avoid an often unnecessary "flood of information" for a user and to display and/or output an assistance adapted to the respective requirements and knowledge of a user.

For example, it is possible to change both the extent of the help information 3 and the manner of display and/or output of the help information 3 depending on the given situation. For example, help information 3 can be provided by displaying moving (animated) images, characters, text and/or symbols and/or by outputting of a spoken explanation, with a first display and/or output, but with a repeated help information 3 by only displaying a non-animated image. This makes it possible to evoke a memory of the animated and/or acoustically provided assistance at a user or it is possible to offer the user a memory aid for inputting a space at the device.

A user can be recognized in any suitable manner. For example, a user can be identified by a vehicle key used. In the case of a vehicle having a central lock which can be operated by radiowaves or infrared rays, coded signals are exchanged between key and a receiver allocated to the vehicle. These coded signals can be supplemented, for example, by user information and evaluated in a corresponding evaluating facility.

However, a user can also be recognized, for example, via a GSM or UMTS terminal used by him (mobile telephone, PDA, tablet PC, Notebook). Every mobile telephone has an IMEI (International Mobile Equipment Identity) number by which every GSM or UMTS terminal can be identified unambiguously. So that a user can be identified by the GSM or UMTS terminal used by them, it is only necessary that a user registers or authenticates himself with his GSM or UMTS terminal on or after entering into the vehicle and there are user data relating to the respective user recognized available in a storage device which is either allocated to the vehicle or to which access exists from the vehicle.

According to the proposed method, however, a user can be recognized also by all further technologies available currently and in the future, for example via face recognition, voice recognition, ocular fundus recognition, fingerprint recognition, etc.

The selection of a known user can also be carried out in a simple manner in that a user, when entering into a vehicle, selects and activates a user profile stored for him, the user profile being stored, for example, in a storage device allocated to the vehicle.

The recognition of whether it is a (first) trip or already a further (second) trip and thus a reset of the type and/or the extent of the display and/or output of the assistance should take place and can be effected, for example, via the detection of the voltage present at the terminal 15 of an ignition start switch. However, since it frequently occurs that a trip is interrupted for a relatively short period of time, a certain time interval can be additionally provided for trip recognition which must have passed onto the recognition of a further (second) trip.

The periods which must have passed so that a (more) detailed assistance is displayed and/or output again for the possibility of input for a space to a recognized and/or known user can be selected in any suitable manner.

In the case of devices allocated to a vehicle in which characters and/or symbols can be input, selected and/or deleted it is possible to distinguish between a selection of characters/symbols by a so-called "speller" and (particularly in the case of more modern devices) the input by using a touchpad or a touch-sensitive screen.

In the case of a speller, one or more characters (letters, numbers, spaces etc.) and/or symbols can be selected usually with the aid of a rotary/push-type controller by rotating the rotary/push-type controller and be selected by pressing the rotary/push-type controller. In a similar manner, one or more characters already selected can be deleted again by selecting a deletion function by rotating the rotary/push-type controller and subsequently pressing the rotary/push-type controller.

As already mentioned above, it is also possible—particularly in more modern devices to write characters and/or symbols onto a touchpad or a touch-sensitive screen and allowing the written characters to be recognized by handwriting recognition. Similarly, it is possible to input a space in this mode by a corresponding operating action. As a rule, a user can switch to and fro between the two input modes (speller and touch-sensitive surface).

If then a user wishes to input a space in a mode in which the input occurs by a touch-sensitive surface, it may occur that he does not know how this is possible at the device in this mode. He will, therefore, change frequently into the speller mode for this purpose, input a space with the aid of the speller and change back into the mode by using a touch-sensitive surface.

If this is recognized, that is to say a non-optimal manner of how a user inputs a space at the device is recognized, this can also serve as trigger criterion for the display/output of an assistance in which case, a help information 3 can be displayed and/or output to the user as to how he can input a space by a simple and rapid operating action in the "touch-sensitive surface" mode.

Changing between various operating modalities by a user can also be used for the recognition process on the basis of which it is recognized whether a space will be input with a predeterminable degree of probability by the user in a next operating action. For example, if a user first performs an input of characters/symbols with the aid of a touchpad and then changes into the speller for the (probable) input of a space.

In order to avoid an unnecessary "flood of information" or an annoyance for the user, it is also provided that the assistance can be deactivated, for example by a particular operating action of the user or another person, for example a workshop colleague authorized for this purpose. If the relevant or another user would like to receive the assistance again, it can naturally be activated again by a corresponding operating action.

As already mentioned above, the help information 3 can be provided in any suitable for example, in the form of a display of moving or static (unmoving) images, characters, text and/or symbols and/or in the form of the output of a spoken text (reproduced via a loudspeaker facility).

FIG. 2 shows a segment from a screen of a navigation system. Within the segment, an example of a proposed display is shown. In an upper line (input field), several characters already selected or input ("Ingolstadt" in the chosen example) can be seen in the display facility.

Since it has been recognized by the recognition process that the character sequence "Ingolstadt" is a complete word and the closer specification of a travel destination within Ingolstadt then requires the input of a space in the device shown by way of example, assistance for inputting a space is displayed to the user on the display facility in the example shown in FIG. 2. In the present example that, for inputting a space, he can perform a wiping movement with one finger from the left to the right on the touch-sensitive display facility 1 or a touchpad.

The example shown in FIG. 2 shows an assistance for a device which can be operated by a touch-sensitive display facility 1 or a touchpad. In the case where the device can be operated, e.g., by key(s), a rotary/push-type controller, joystick etc., an accordingly adapted assistance is naturally provided, e.g. a visually and/or acoustically perceptible assistance for which key/combination of keys a user has to press for inputting a space and/or how long the user has to press a particular key/combination of keys for this purpose. In the case of a device which can be operated (also) by voice commands, assistance can also be displayed and/or output to the user with respect to which voice command can be used for inputting a space.

In the example shown, the letter "i" in a circle indicates to a user that this is an informative display.

The user can also have the additional option to obtain additional information with respect to the possibility or possibilities of inputting a space by a further operating action. Such a further operation action can be, for example, the operation of a special "help key", the call up of a context menu, pressing with a finger on a place on the display facility 1, e.g. the place at which the "i" in a circle is shown, or a voice command. The additional information can then also be displayed or output in any suitable manner, for example in the form of a displayed animation, the display of a help text and/or in the form of a spoken text reproduced via a loudspeaker facility.

The inventors also propose a device allocated to a vehicle, with an operating facility, by which at least alphanumeric characters and/or symbols 2 can be input or selected and assembled to form a group of characters or functions, with a first display facility 1 on which the characters, symbols, group of characters and/or functions can be displayed in at least one input field, and a help facility by which at least one help information 3 for at least one operating action at the device can be displayed visually for a user on the first or a second display facility and/or output acoustically by a loudspeaker facility.

The device is characterized by the fact that it has a recognition device by which it is recognized whether a space will or has to be input by the user in a next operating action with a predeterminable degree of probability and the help facility is configured that in the case where a positive result of the recognition is found by way of the recognition device, an assistance is displayed to the user on the first or second display facility and/or output by the loudspeaker facility, in such a manner that the assistance exhibits help information 3 on how a space can be input at the device by an operating action.

Since it is known to an expert how the device can be designed and suitable equipment for carrying out the recognition and for outputting the assistance are known to him, this does not need to be discussed in greater detail. These functions can be handled, for example, by a computer facility such as that is present in the head unit of modern vehicles.

In the device, the help facility can be advantageously arranged so that it displays the assistance in the form of moving or static images, characters, text and/or symbols on the first or second display facility and/or outputs it in the form of a spoken text by the loudspeaker facility.

According to a further advantageous embodiment of the device, the help facility is arranged so that it displays and/or outputs the assistance in dependence on (a) how often the assistance for inputting a space at the device during a trip has already been displayed and/or output, (b) how often the assistance for inputting a space at the device has already been displayed and/or output to a recognized and/or known user within a predeterminable period of time and/or (c) in what manner a user inputs a space at the device.

With respect to these possible variations of the assistance, reference is made to the corresponding above statement with respect to the method which can be easily transferred to the device.

An activation or deactivation of the assistance, provided, can take place, for example, with the aid of the operating facility of the device (e.g. keys especially provided for the device, keyboard, touchpad, touch-sensitive screen) but also by any other suitable operating facility such as, for example, by an operating facility provided for a number of devices (e.g. rotary/push-type controller, joystick) but also by external devices (e.g. a facility for performing adjustments at devices of the vehicle as it exists in technical workshops, or by a mobile facility such as, for example, a modern smartphone).

The device can display the assistance on any facility suitable for this purpose and/or output it with any facility suitable for the purpose. To this extent, there are no particular restrictions. Thus, for example, the assistance can be displayed on a display facility 1 exclusively allocated to the device but naturally also by a display facility on which information of a plurality of devices can be displayed. Naturally, the optical displays for the device, e.g. the selected characters/symbols 2 and the assistance can also be represented on various display facilities.

There are also no particular restrictions with respect to the operating facility for the device and these can comprise, for example, at least one key, keyboard, a rotary/push-type controller, joystick, a touchpad, a touch-sensitive screen and/or a device for voice input and voice recognition.

According to a further advantageous embodiment of the device, a space can be input at the latter by substantially horizontally stroking with a finger over a predeterminable distance or a predeterminable proportion of the width of a touch-sensitive screen or touchpad.

In as much as the expression "substantially horizontal" is used in the present application, this is intended to mean a wiping movement which occurs in parallel with the direction in which characters/symbols 2 are also displayed on the display facility 1, wherein the wiping movement does not need to be 100% in parallel with this direction but is allowed to have a deviation of up to 1°, 2°, 3°, 4°, 5°, 6°, 7°, 8°, 9°, 10°, 15° or 20°.

The "predeterminable distance or the predeterminable proportion of the width of the touch-sensitive screen or touchpad" is not particularly restricted but should be selected to be large enough to trigger a deletion of all characters only when this is desired by the user. For example, the "predeterminable distance" can be 2 cm, 3 cm, 4 cm or 5 cm. And the "proportion of the width" can be, for example, 10%, 15%, 20%, 25%, 30%, 35%, 40%, 45% or 50%.

Such inputting is also the basis of the example shown in FIG. 2. In the case of writings which are written from left to right, inputting of a space will occur preferably by substantially horizontally stroking with a finger from left to right. In the case of writings which are written from right to left, in contrast, a space will preferably be input by substantially horizontally stroking with the finger from right to left.

Naturally, the example shown in FIG. 2 represents only one of many possibilities for inputting spaces. Spaces can be input by any suitable interaction, the help information displayed/output, naturally being provided in a manner adapted to the respective interaction.

The example shown in FIG. 2 relates to a navigation system. Naturally, the proposed method and device are not restricted to the application in a navigation system but can be used for all types of devices allocated to a vehicle in which the input of spaces occurs or can occur such as, for example, a multimedia system, an automobile telephone system or a device integrated in a vehicle for Internet access.

According to the current related art, assistance for a device in a vehicle is, as a rule, user-initiated or is displayed and/or output in a system-initiated manner in dependence on boundary conditions (e.g. "observe safe lock" when switching off the ignition).

Simple control leads to inconvenience for the driver or user due to ever recurring assistance messages.

By the present proposals, assistance is displayed/output for a user with respect to how he can input a space at a device.

This results in optimum support for the user. As well, the period of time and attention needed by a user for the input process for a space and thus for the entire input process is reduced as a result of which a distraction of the driver from the road traffic, which is undesirable in the sense of traffic safety, is minimized.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for providing a system-initiated help for operating a device allocated to a vehicle, comprising:
   receiving at an operating facility, characters input by a user, that can be assembled to form a group of characters;

displaying by a display the characters and group of characters in at least one input field;

while receiving characters input by the user at the operating facility, using a processor to recognize with a predeterminable degree of probability based on the characters, whether a space will or must be input by a user as a next input action before a next character;

when it is recognized that a space will or must be input by a user, providing, by a processor, help information to the user, the help information providing assistance to the user on how to operate the operating facility to input a space at the operating facility by an operating action, immediately before the next character, wherein the help information is acoustically output by a loudspeaker and/or visually output by displaying an assistance to the user on a display device separate from any display device functioning as the operating facility.

2. The method as claimed in claim 1, wherein
the help information is visually output by displaying moving or static images, characters, text and/or symbols.

3. The method as claimed in claim 1, wherein
the help information is acoustically output as a spoken text.

4. The method as claimed in claim 1, wherein the help information is output in dependence on at least one of:
how many times the help information has already been output during a trip,
when a current user is a recognized user, how many times the help information has already been output to the recognized user within a predeterminable period of time, and
the manner in which the current user inputs a space at the operating facility.

5. The method as claimed in claim 1, further comprising:
selectively activating and deactivating providing of the help information based on input from the user.

6. The method as claimed in claim 1, wherein
a first display device provides the at least one input field in which the characters and group of characters are displayed, and
the help information is visually output by displaying the assistance to the user on the first display device, directly next to the character after which it is assumed the user will or must input a space.

7. The method as claimed in claim 1, wherein
a first display device provides the at least one input field in which the characters and group of characters are displayed, and
the help information is visually output by displaying the assistance to the user on a second display device.

8. The method as claimed in claim 1, wherein
the characters are selected from the group consisting of alphanumeric characters and symbols.

9. The method as claimed in claim 1, wherein
at least first and second operating facilities are used to input characters,
the first operating facility comprises a speller and a rotary/push controller with which characters are selected, and
the second operating facility comprises a touch pad and a handwriting recognition unit to recognize characters written on the touch pad.

10. The method as claimed in claim 9, wherein
the help information is output in dependence on the operating facility used by the user to input a space, and more help information is provided if the user has previously used the touchpad for inputting characters and used the rotary/push controller for inputting spaces.

11. The method as claimed in claim 9, wherein
if the user switches from the touchpad to the rotary/push controller, it is recognized with a predeterminable degree of probability that a space will or must be input by the user.

12. The method as claimed in claim 9, wherein
the help information provides assistance on how a space can be input using the touchpad.

13. The method as claimed in claim 1, wherein
the help information is selected from more detailed help information and less detailed help information, and
the selection between the more detailed help information and the less detailed help information is made in dependence on at least one of:
how many times the help information has already been output during a trip,
when a current user is a recognized user, how many times the help information has already been output to the recognized user within a predeterminable period of time, and
the manner in which the current user inputs a space at the operating facility.

14. A device allocated to a vehicle, comprising:
an operating facility by which characters are input that can be assembled to form a group of characters;
a display device to display the characters and group of characters in at least one input field of the display device;
one or more processors to:
recognize with a predeterminable degree of probability based on the characters, while a user is inputting characters, whether a space will or must be input by the user as a next operating action before a next character; and
provide help information to the user when it is recognized that a space will or must be input by the user, the help information providing assistance to the user on how to operate the operating facility to input a space at the operating facility by an operating action, immediately before the next character, wherein
the operating facility is a device different from the display device, and
the help information is acoustically output by a loudspeaker and/or visually output by displaying an assistance to the user on the display device.

15. The device as claimed in claim 14, wherein
the help information is visually output as moving or static images, characters, text and/or symbols.

16. The device as claimed in claim 14, wherein
the help information is acoustically output as a spoken text from the loudspeaker.

17. The device as claimed in claim 14, wherein the help information is output in dependence on at least one of:
how many times the help information has already been output during a trip,
when a current user is a recognized user, how many times the help information has already been output to the recognized user within a predeterminable period of time, and
the manner in which the current user inputs a space at the operating facility.

18. The device as claimed in claim 14, wherein
user activation and user deactivation of the help information take place with a user input device.

19. The device as claimed in claim 14, wherein
the at least one display device comprises at least one of a screen and a head-up display, and
the operating facility comprises at least one of a key, a keyboard, a rotary/push controller, a joystick, a touchpad, a touch-sensitive screen, and a voice recognition device.

20. The device as claimed in claim 14, wherein a space is input by a substantially horizontal stroking of a finger over a predeterminable distance or width proportion of a touch-sensitive screen or touchpad.

21. A method for providing a system-initiated help for operating a device allocated to a vehicle, comprising:
providing first and second separate operating facilities to input characters, the first operating facility being a rotary/push controller;
receiving via at least one of the first and second operating facilities characters input by a user, that can be assembled to form a group of characters;
displaying by a display the characters and group of characters in at least one input field;
while receiving characters input by the user via at least one of the first and second operating facilities, using a processor to recognize with a predeterminable degree of probability based on the characters, whether a space will or must be input by a user as a next input action before a next character;
when it is recognized that a space will or must be input by a user, providing, by a processor, help information to the user, the help information being visually output by displaying an assistance to the user and/or being acoustically output by a loudspeaker, the help information providing assistance to the user on how to operate at least one of the first and second operating facilities to input a space by an operating action immediately before the next character, using at least one of the first and second operating facilities, wherein
the help information is output only if the user previously used the first operating facility to input a space.

* * * * *